(12) United States Patent
Cruz-Hernandez et al.

(10) Patent No.: US 8,866,601 B2
(45) Date of Patent: Oct. 21, 2014

(54) OVERDRIVE VOLTAGE FOR AN ACTUATOR TO GENERATE HAPTIC EFFECTS

(71) Applicant: Immerson Corporation, San Jose, CA (US)

(72) Inventors: Juan Manuel Cruz-Hernandez, Montreal (CA); Robert Lacroix, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 60 days.

(21) Appl. No.: 13/759,288

(22) Filed: Feb. 5, 2013

(65) Prior Publication Data

US 2014/0218185 A1    Aug. 7, 2014

(51) Int. Cl.
*H04B 3/36* (2006.01)
*G08B 6/00* (2006.01)

(52) U.S. Cl.
CPC ........................................ *G08B 6/00* (2013.01)
USPC ..................................... 340/407.1; 340/4.12

(58) Field of Classification Search
USPC ........... 340/407.1, 407.2, 662, 4.12; 345/173, 345/184; 715/701, 702
See application file for complete search history.

(56) References Cited

U.S. PATENT DOCUMENTS

| 7,639,232 | B2 | 12/2009 | Grant et al. |
| 7,742,036 | B2 | 6/2010 | Grant et al. |
| 7,843,277 | B2 * | 11/2010 | Gregorio et al. ................ 331/65 |
| 7,920,694 | B2 * | 4/2011 | Cruz-Hernandez et al. ........................ 379/374.03 |
| 2008/0252594 | A1 | 10/2008 | Gregorio et al. |

OTHER PUBLICATIONS

M. Willis et al.; "Advanced Process Control"; Newcastle University School of Chemical Engineering and Advanced Materials; Newcastle upon Tune, UK; © 21994-2009; http://lorien.ncl.ac.uk/ming/advcontrl/sect3.htm; last downloaded Nov. 6, 2012.

* cited by examiner

*Primary Examiner* — Toan N Pham
(74) *Attorney, Agent, or Firm* — Miles & Stockbridge P.C.

(57) ABSTRACT

A system in which haptic effects are generated using an actuator receives a frequency response for the actuator at a standard voltage and generates a lookup table for an overdrive voltage based on the frequency response. The system then receives a haptic signal for the haptic effect and extracts one or more frequencies for the haptic signal. The system then determines the corresponding overdrive voltage from the lookup table for each of the frequencies and, for each of the frequencies, applies the corresponding overdrive voltage to the actuator. The overdrive voltage is greater than or equal to the standard voltage.

20 Claims, 10 Drawing Sheets

OVERDRIVE VOLTAGE FOR AN ACTUATOR TO GENERATE HAPTIC EFFECTS

FIELD

One embodiment of the present invention is directed to an actuator. More particularly, one embodiment of the present invention is directed to an actuator used to generate haptic effects.

BACKGROUND

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects." Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable electronic devices, referred to as "handheld devices" or "portable devices," such as cellular telephones, personal digital assistants ("PDA's"), smartphones, and portable gaming devices. For example, some portable gaming applications are capable of vibrating in a manner similar to control devices (e.g., joysticks, etc.) used with larger-scale gaming systems that are configured to provide haptic feedback. Additionally, devices such as cellular telephones and smartphones are capable of providing various alerts to users by way of vibrations. For example, a cellular telephone can alert a user to an incoming telephone call by vibrating. Similarly, a smartphone can alert a user to a scheduled calendar item or provide a user with a reminder for a "to do" list item or calendar appointment. Further, haptic effects can be used to simulate "real world" dynamic events, such as the feel of a bouncing ball in a video game.

SUMMARY

On embodiment is a system in which haptic effects are generated using an actuator. The system receives a frequency response for the actuator at a standard voltage and generates a lookup table for an overdrive voltage based on the frequency response. The system then receives a haptic signal for the haptic effect and extracts one or more frequencies for the haptic signal. The system then determines the corresponding overdrive voltage from the lookup table for each of the frequencies and, for each of the frequencies, applies the corresponding overdrive voltage to the actuator. The overdrive voltage is greater than or equal to the standard voltage.

DETAILED DESCRIPTION

In many devices, an actuator is used to create the vibrations that comprise some haptic effects. For example, one type of actuator that is frequently used in portable electronic devices is a Linear Resonant Actuator ("LRA"). Typically, an LRA requires a bidirectional signal (i.e., an alternating positive voltage and negative voltage signal) in order to create the desired vibrations. Further, the frequency range of a typical LRA is limited to approximately 150 Hz to 200 Hz with a mechanical time constant of about 30 milliseconds. This limited frequency range is in part due to constraints to prevent the mass of the LRA from "hitting" the casing of the LRA during a haptic effect, thereby causing undesired "noise".

Based on the foregoing, there is a need to increase the frequency range of an actuator, such as an LRA, and to minimize its mechanical response time while still maintaining the constraints which prevent the desired vibrations from causing the mass to contact the casing of the actuator.

To achieve this need, one embodiment of the present invention applies a haptic signal to an actuator using a voltage level that is higher (i.e., an "overdrive" voltage) than the manufacturer's recommended voltage (i.e., a "standard" voltage) in order to drive an actuator to increase its dynamic range. The resultant overdriven frequency response is at a higher amplitude than the non-overdriven response. By using an overdrive voltage, a relatively inexpensive actuator such as an LRA can achieve a fast response time and higher dynamic range that is similar to more expensive types of actuators, such as a piezoelectric actuator, when generating haptic effects.

Figure 1:
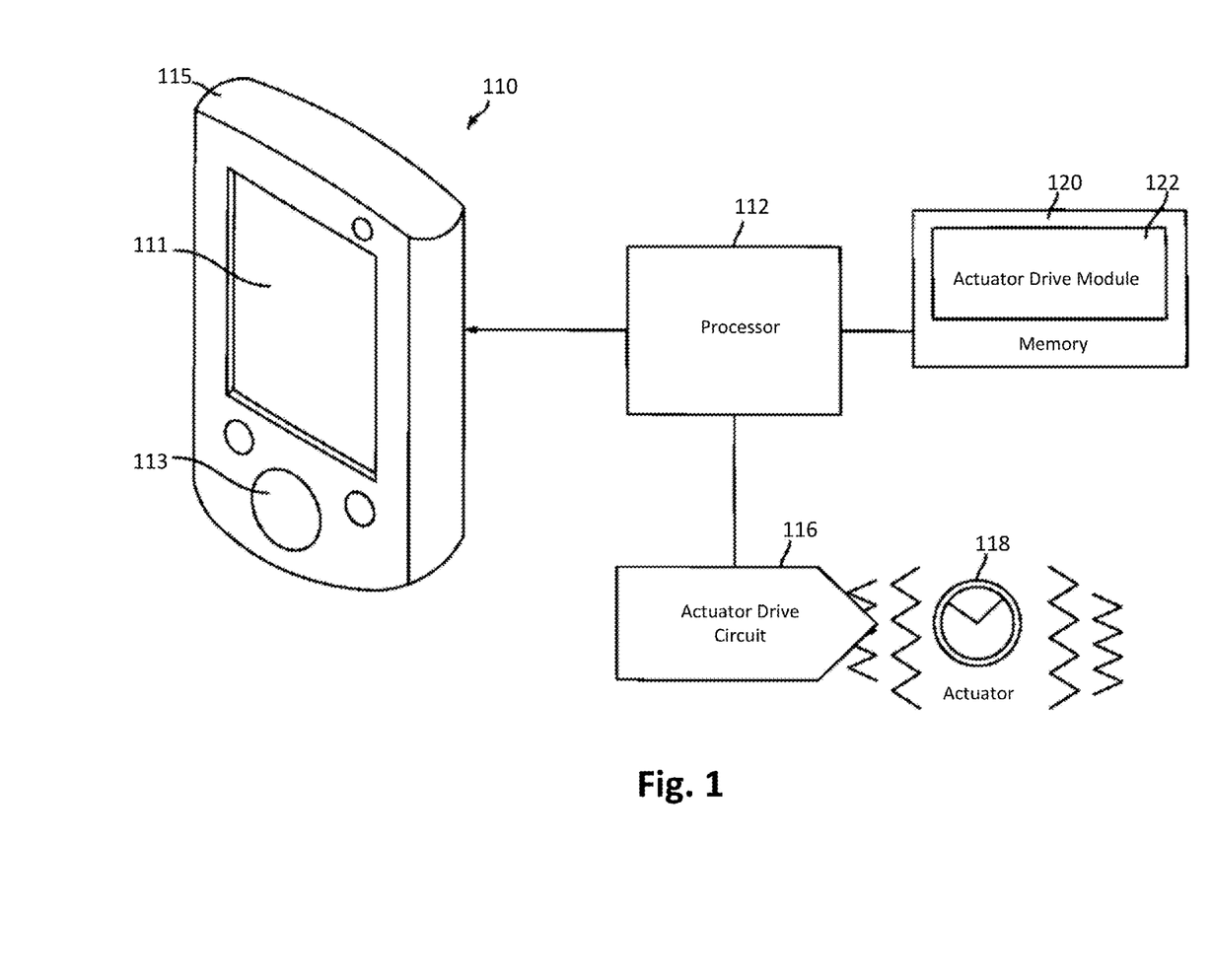
FIG. 1 is a block diagram of a haptically-enabled system in accordance with one embodiment of the invention.

FIG. 1 is a block diagram of a haptically-enabled system 110 in accordance with one embodiment of the invention. System 110 includes a touch sensitive surface 111 or other type of user interface mounted within a housing 115, and may include physical buttons/switches 113. Internal to system 110 is a haptic feedback system that generates haptic effects, such as vibrations, on system 110. In one embodiment, the haptic effects are generated on touch surface 111.

The haptic feedback system includes a processor 112. Coupled to processor 112 is a memory 120 and an actuator drive circuit 116, which is coupled to an actuator 118. Processor 112 may be any type of general purpose processor or controller, or can be a processor specifically designed to provide haptic effects, such as an application-specific integrated circuit ("ASIC"). Processor 112 may be the same processor that operates the entire system 110, or may be a separate processor. Processor 112 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered dynamic if it includes some variation of these parameters when the haptic effect is generated or a variation of these parameters based on a user's interaction.

Processor 112 outputs the control signals to drive circuit 116, which includes electronic components and circuitry used to supply actuator 118 with the required electrical current and voltage to cause the desired haptic effects. System 110 may include more than one actuator 118, and each actuator may include a separate drive circuit 116, all coupled to a common processor 112. Memory 120 can be any type of storage device or computer-readable medium, such as random access memory ("RAM") or read-only memory ("ROM"). Memory 120 stores instructions executed by processor 112. Among the instructions, memory 120 includes an actuator drive module 122 which are instructions that, when executed by processor 112, generate drive signals for overdriving actuator 118, as discussed in more detail below. Memory 120 may also be located internal to processor 112, or any combination of internal and external memory.

System 110 may be a handheld device, such a cellular telephone, personal digital assistant ("PDA"), smartphone, computer tablet, gaming console, etc. or may be any other type of device that provides a user interface and includes a haptic effect system that includes one or more actuators. The user interface may be a touch sensitive surface, or can be any other type of user interface such as a mouse, touchpad, minijoystick, scroll wheel, trackball, game pads or game controllers, etc. In embodiments with more than one actuator, each actuator may have a different output capability in order to create a wide range of haptic effects on the device. Each actuator may be any type of haptic actuator or a single or multidimensional array of actuators. Actuator 118 may be, for example, an electric motor, an electro-magnetic actuator, a voice coil, a shape memory alloy, an electro-active polymer, a solenoid, an eccentric rotating mass motor ("ERM"), an LRA, a piezoelectric actuator, a high bandwidth actuator, an electroactive polymer ("EAP") actuator, an electrostatic friction display, or an ultrasonic vibration generator.

In one embodiment, the frequency content of the haptic effect is identified and extracted in order to overdrive the actuator. Identifying the frequency content in a given haptic effect can be divided into two general categories: (1) Identification of the frequency when the haptic effect is parameterized; and (2) Identification of the frequency when the haptic effect contains an arbitrary signal.

Parameterized Haptic Effects

Figure 2:
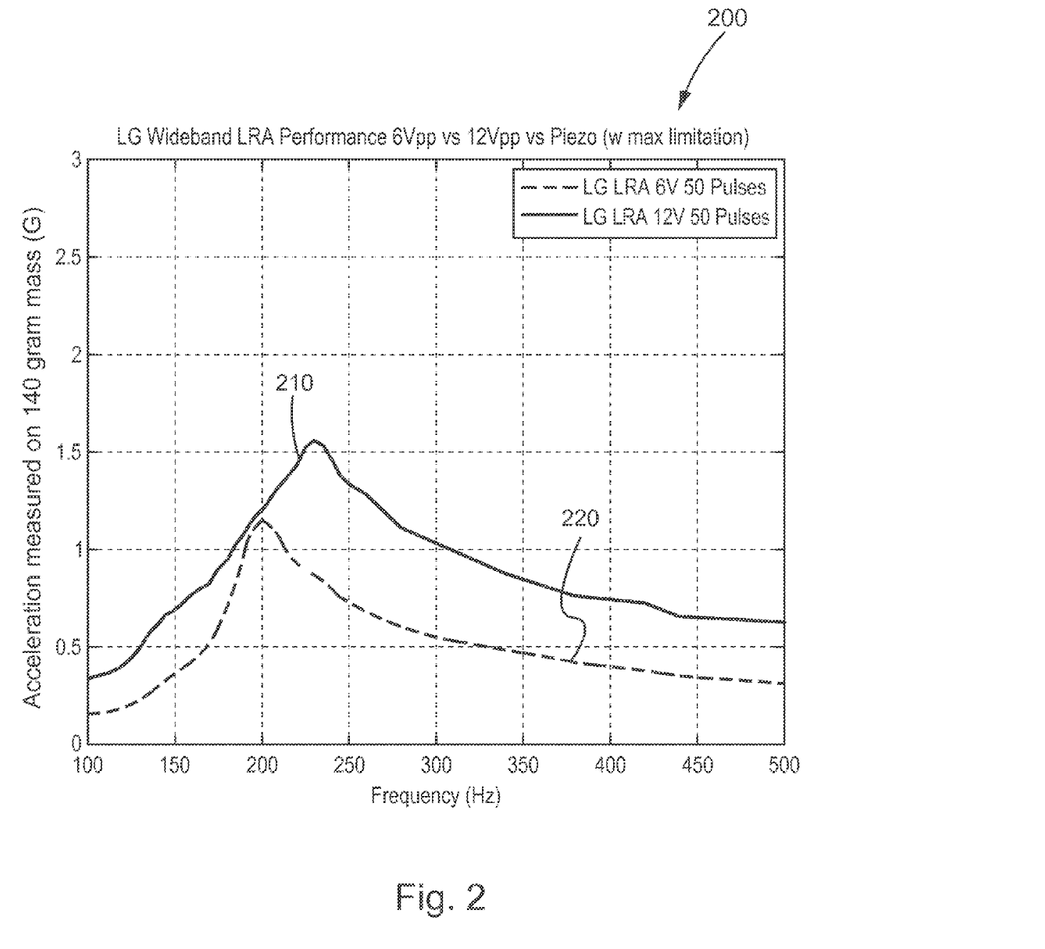
FIG. 2 illustrates an example frequency response for an actuator in accordance with an embodiment of the invention.

When the haptic effect is parameterized, the frequency value is generally already known. FIG. 2 illustrates an example frequency response 200 for an LRA (e.g., actuator 118 of FIG. 1), according to an embodiment of the invention. Frequency response 200 include acceleration of a mass versus frequency plots 210, 220. Plot 210 shows the frequency response when the actuator is overdriven at 12V peak-to-peak ("pp") and a 50 pulses sinusoidal signal in accordance with an embodiment. Plot 220 shows the same example actuator's original (i.e., non-overdriven, manufacturer recommended voltage level) response at 6V peak-to-peak and a 50 pulses signal. Plot 210 shows that from 100 Hz to 500 Hz the overdriven response results in a higher magnitude acceleration for the actuator when compared with the non-overdriven response of plot 220 within the same frequency range. Thus, the dynamic range of the example actuator has increased when overdriven in accordance with embodiments of the present invention. For example, at 250 Hz, the frequency response of the overdriven actuator is approximately double of the non-overdriven actuator.

Figure 3:
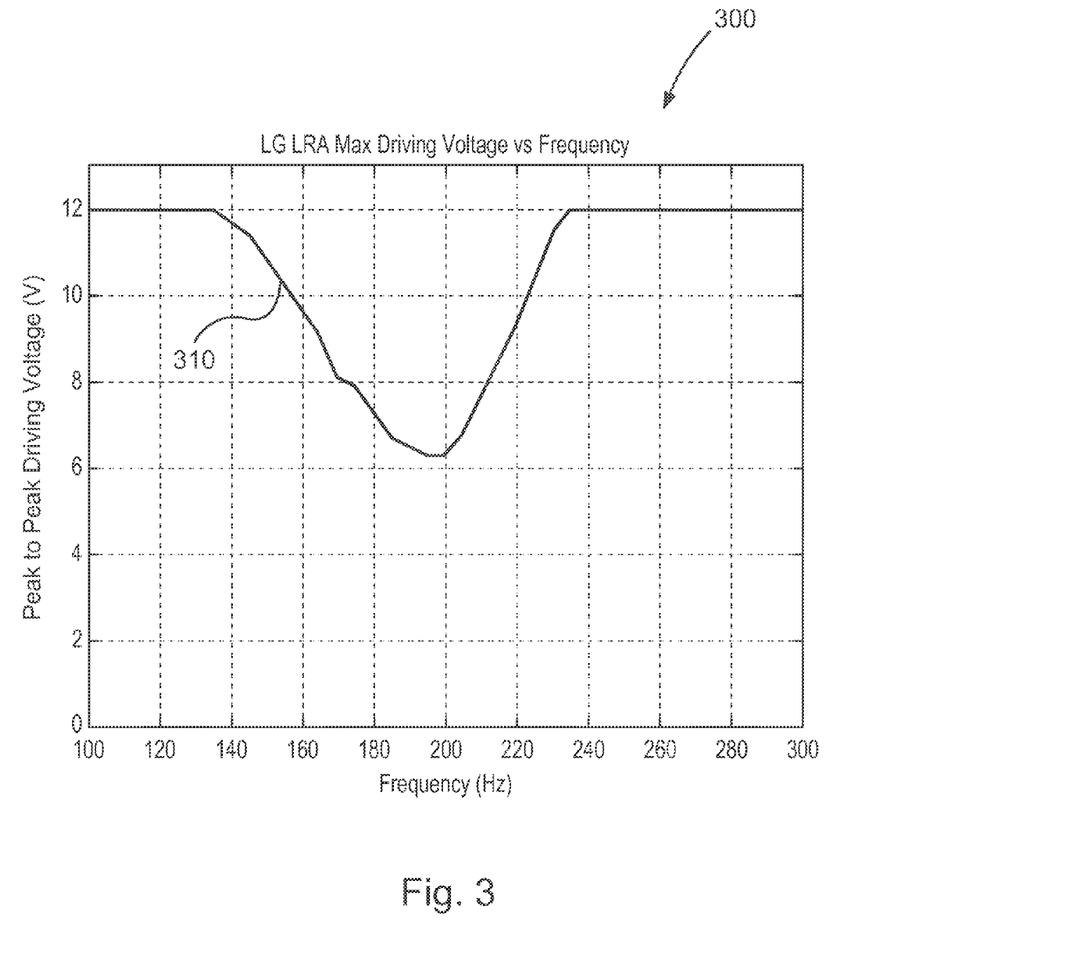
FIG. 3 illustrates an example inverted frequency response look-up table of the frequency response shown in FIG. 2 in accordance with one embodiment.

FIG. 3 illustrates an example inverted frequency response look-up table 300 of frequency response 220 shown in FIG. 2 in accordance with one embodiment. Inverted frequency response lookup table 300 includes an inverted frequency response plot 310 which may be used to lookup peak-to-peak driving voltage value based on frequency, which in turn determines the overdriven response plot 210 in accordance with one embodiment. Lookup table 300 is generated from the frequency response of the actuator, as indicated by plot 220 of FIG. 2. Plot 310 is used as a lookup table to determine the driving voltage for a particular actuator, and may vary from system to system or from actuator to actuator. Plot 310 may be generated using various known techniques of control theory to invert the plant. For example, plot 310 may be generated by inverting the frequency response of a particular system or actuator, by deriving a (dynamic) mathematical model of the actuator and then computing the inverse of it, or by empirically measuring the response of the actuator to different input signals and using that information to derive a look up table that indicates what overdrive is needed at what frequencies.

In one embodiment, the inverted frequency response plot 310 may be determined and the overdriving voltage values may be retrieved by instructions stored in actuator drive module 122 of FIG. 1. For each frequency value of the haptic effect signal, module 122 then can look up the corresponding overdrive voltage using plot 310 as a lookup table. For example, according to table 300, at 120 Hz the overdrive voltage is 12V. Further, at or near the resonance frequency of 200 Hz for the actuator of FIG. 3, the overdrive voltage is approximately 6V, which in practice prevents the undesired "hitting" effect for the actuator. As is shown by plot 310 in table 300, there is a "notch" effect at or near resonance (200 Hz in this example) which can be obtained through the use of notch filters in the system. Further, the actuator may be driven with a periodic waveform, as opposed to overdriving the actuator using the same voltage at all frequencies. One embodiment applies the overdrive signal at different voltage levels as a function of frequency as shown in FIG. 3.

In one example embodiment, parameterized overdriven haptic effects having known frequencies are generated by applying lookup table 300 to each known frequency. For instance, if the known frequency parameter is 100 Hz, actuator drive module 122 will look at the driving frequency value and extract the overdrive voltage value of 12V. As another example, if the known frequency parameter is 200 Hz, actuator drive module 122 will look at the driving frequency value and extract the overdriven voltage value of 6.2V. For known frequencies above 240 Hz the extracted overdrive voltage value would be 12V.

Figure 4A:
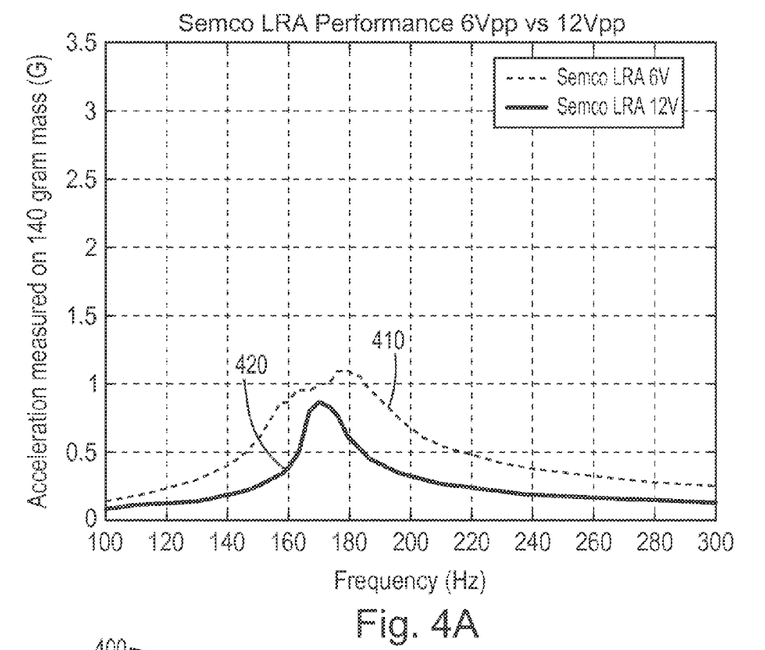
FIGS. 4A and 4B illustrate another example of an actuator having a frequency response, and the corresponding generated lookup table.
Figure 4B:
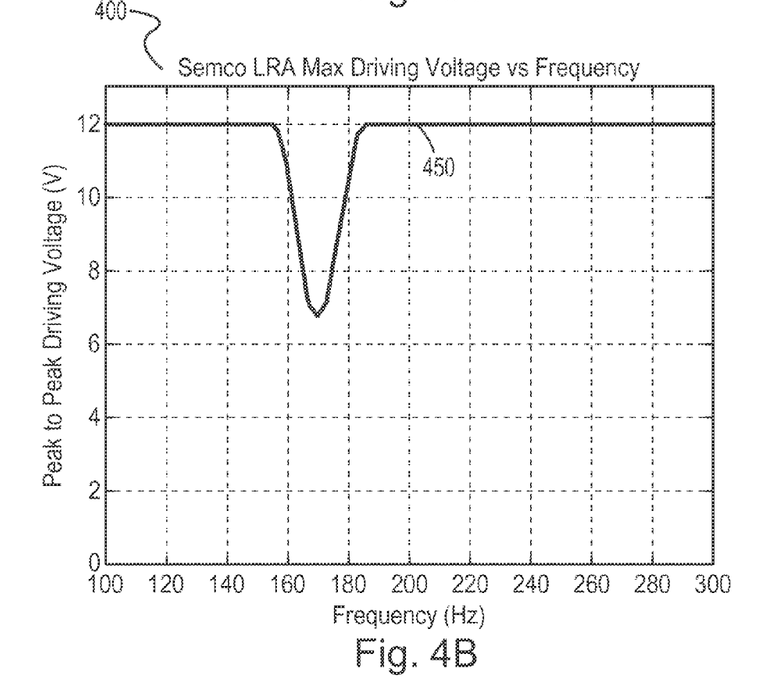

FIGS. 4A and 4B illustrate another example of an actuator having a frequency response, and the corresponding generated lookup table. In FIG. 4A, the frequency response for the standard 6V signal is at plot 420, and the frequency response for the overdriven 12V signal is at plot 410. Table 400 of FIG. 4B is the generated lookup table, and includes an inverted signal plot 450.

Figure 5:
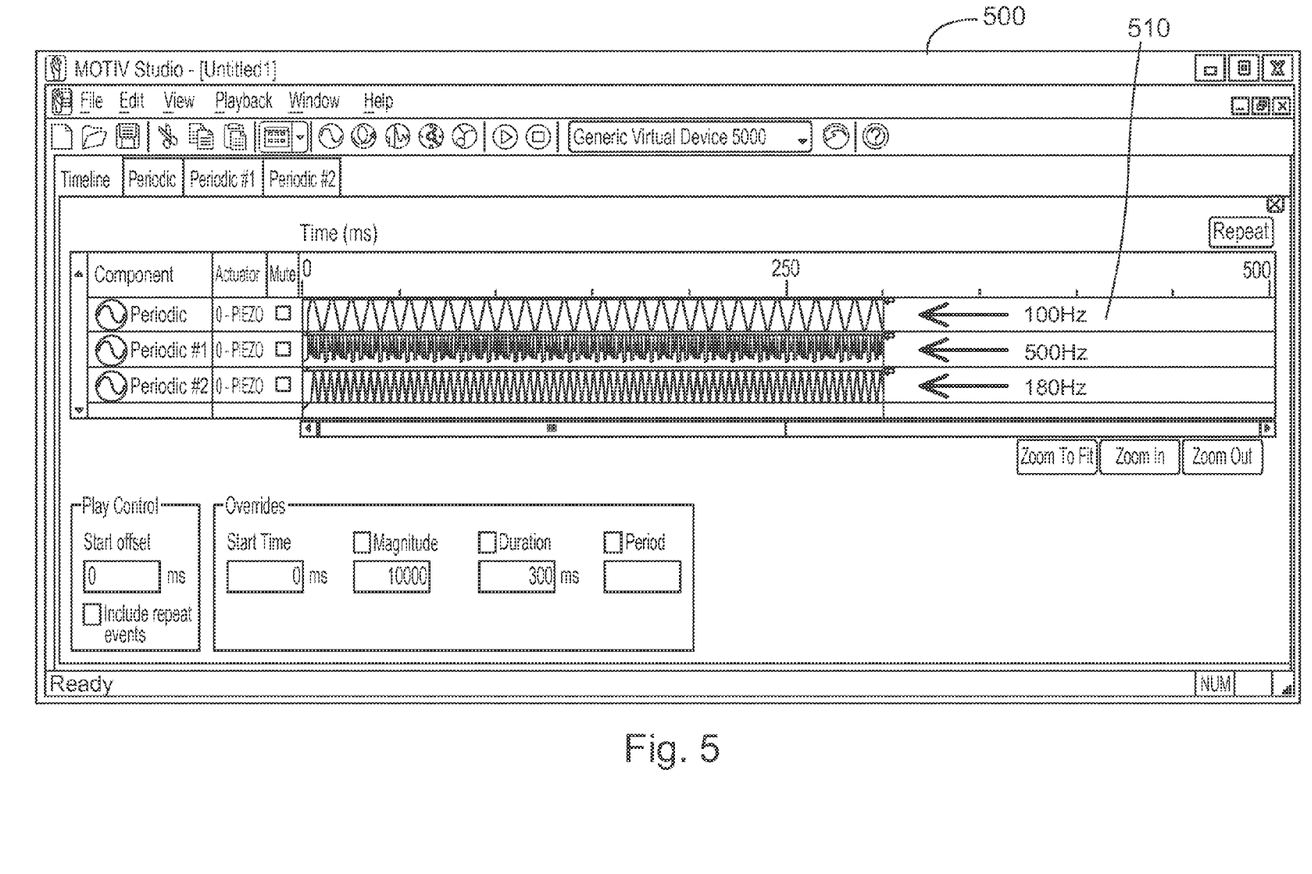
FIG. 5 illustrates an example parameterized effect with multiple frequencies, according to an embodiment of the invention.

FIG. 5 illustrates an example parameterized effect with multiple frequencies, according to an embodiment of the invention. In this example, several superimposed, parameterized effects can make up the haptic effect, as shown at 500. Frequencies 510 include 100 Hz, 500 Hz and 180 Hz. In this example there are three frequencies 510 in a single haptic effect, and actuator drive module 122 looks at all frequencies and uses the smallest driving voltage among all of them based on the lookup table. For the actuator of FIGS. 2 and 3, actuator drive module 122 would select 7V, which corresponds to 180 Hz and is the smallest driving voltage in lookup table 300 among three frequencies of 100 Hz, 500 Hz and 180 Hz. As can be seen by FIG. 3, if either 100 Hz or 500 Hz was chosen, the driving voltage across all three frequencies would be too high (i.e., 12V) between 140 Hz and 240 Hz near the resonant frequency of the actuator, resulting in "noise" and a possibility of the mass "hitting" the case of the actuator, especially at resonance frequency.

Arbitrary Haptic Effects

Figure 6:
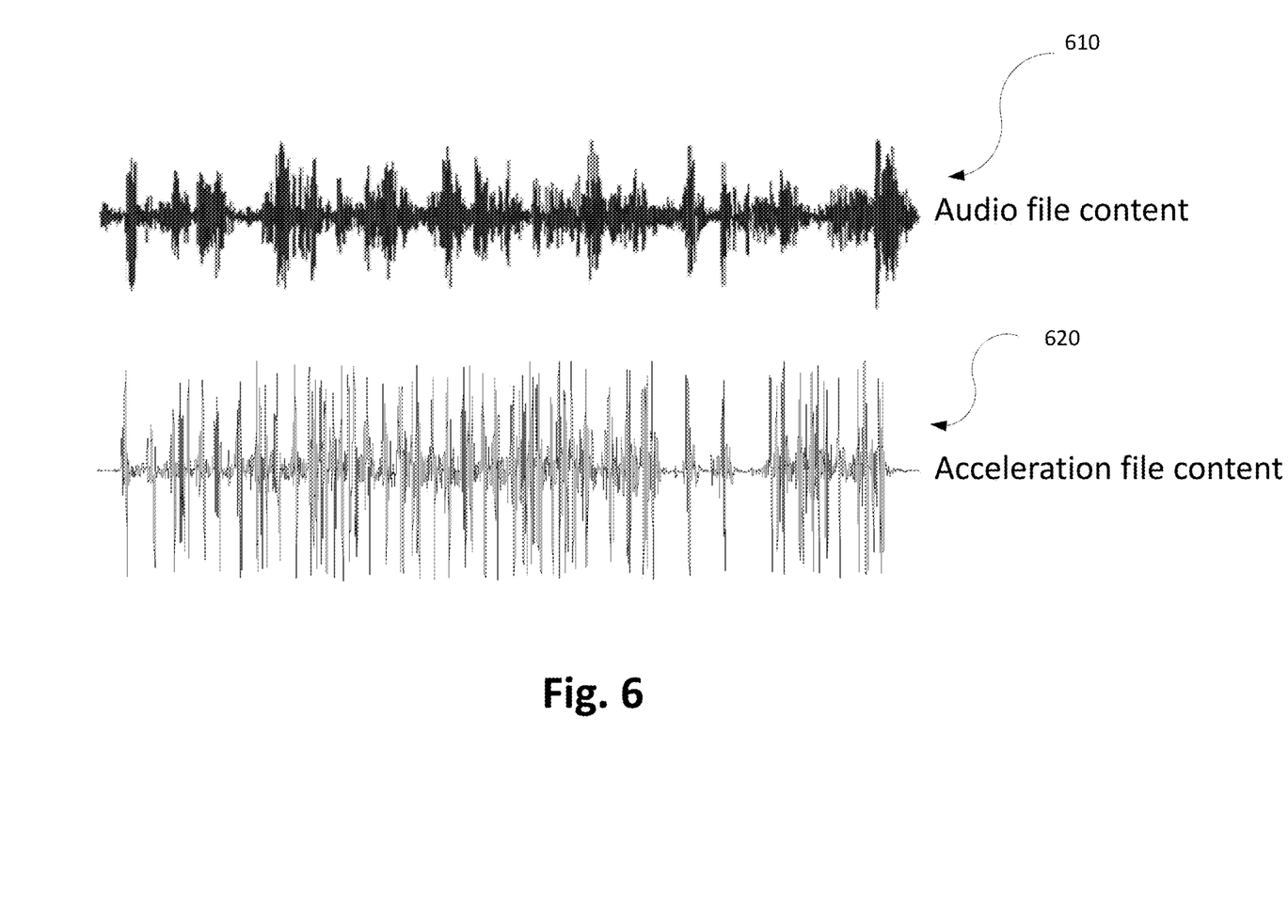
FIG. 6 illustrates example arbitrary haptic effect signals according to one embodiment of the invention.

FIG. 6 illustrates example arbitrary haptic effect signals according to one embodiment of the invention. Haptic effects can be created using arbitrary signals, for example from an audio file 610 or from a sensor recording (e.g., an accelerometer) resulting in an acceleration file 620.

In one embodiment, the frequency content of each arbitrary signal is extracted in order to allow actuator drive module 122 to obtain the overdrive voltage to apply to actuator 118. In one embodiment, to extract the frequency content of acceleration file 620, the time domain signal is divided into small sections or time durations (e.g., 10 milliseconds or 20 milliseconds) and then the frequency content of each small section is extracted through frequency domain techniques, such as filtering or Fast Fourier Transform ("FFT"). Next, the dominant frequency found in each small section or data chunk can be used to find the appropriate overdrive voltage via lookup table 300 of FIG. 3. The next data chunk would be processed similarly and a new overdrive voltage would be determined, etc.

Figure 7A:
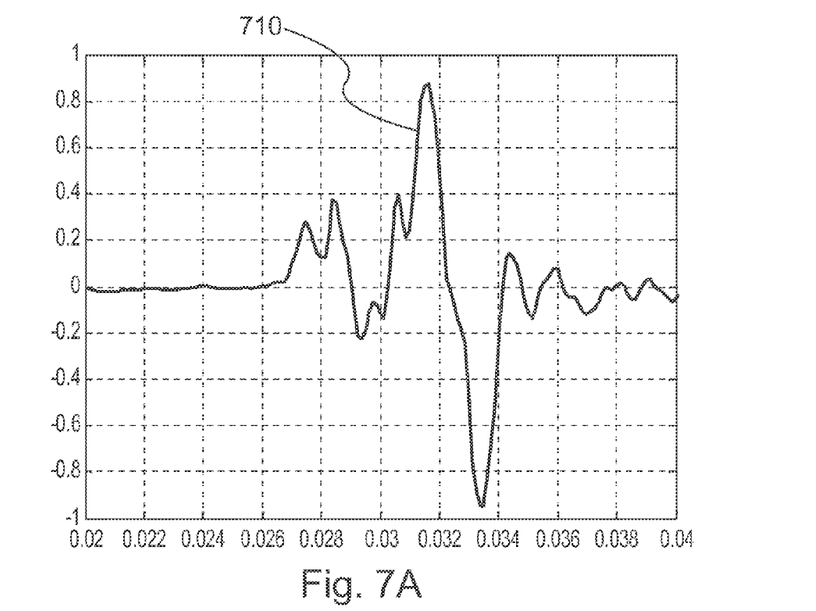
FIGS. 7A-7F illustrate plots of an example arbitrary signal separated by time durations, according to an embodiment of the invention.
Figure 7B:
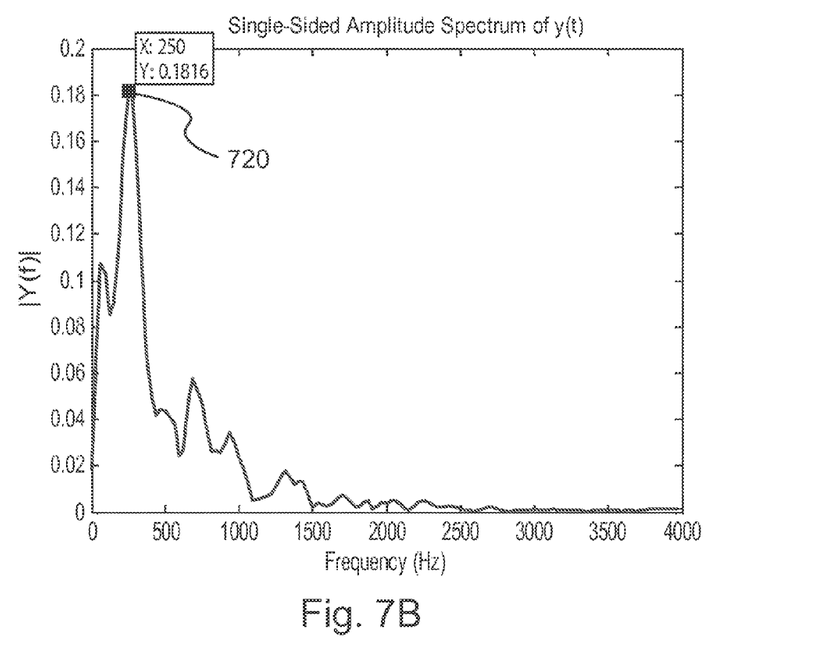

FIGS. 7A-7F illustrate plots of example arbitrary signal acceleration file 620 of FIG. 6 separated by time durations or "data chunks", according to an embodiment of the invention. FIG. 7A illustrates that the time section of acceleration file 620 taken between 20 milliseconds and 40 milliseconds has measurable frequency content 710. FIG. 7B shows the dominant frequency at 720 corresponds to a frequency of 250 Hz. In this case, actuator drive module 122 would use the overdrive voltage from lookup table 300 corresponding to 250 Hz, since that is the dominant frequency as shown in FIG. 7B.

Figure 7C:
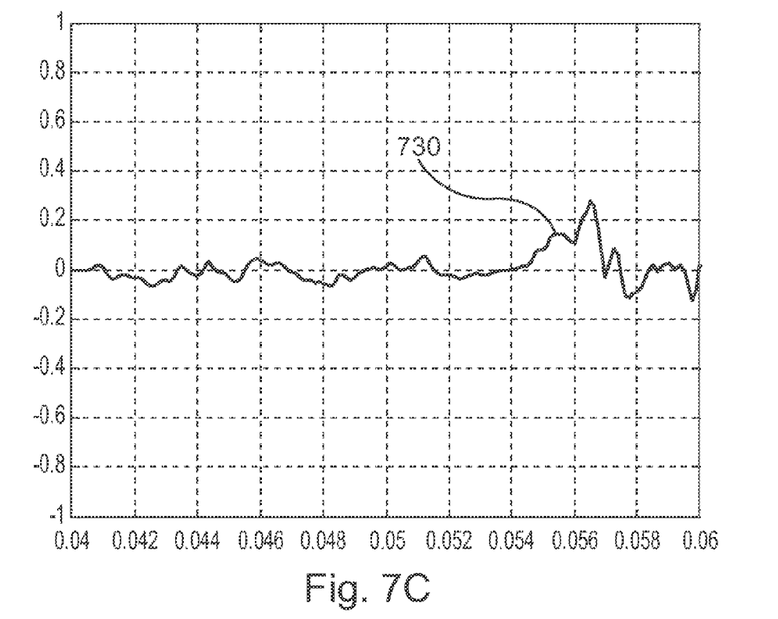
Figure 7D:
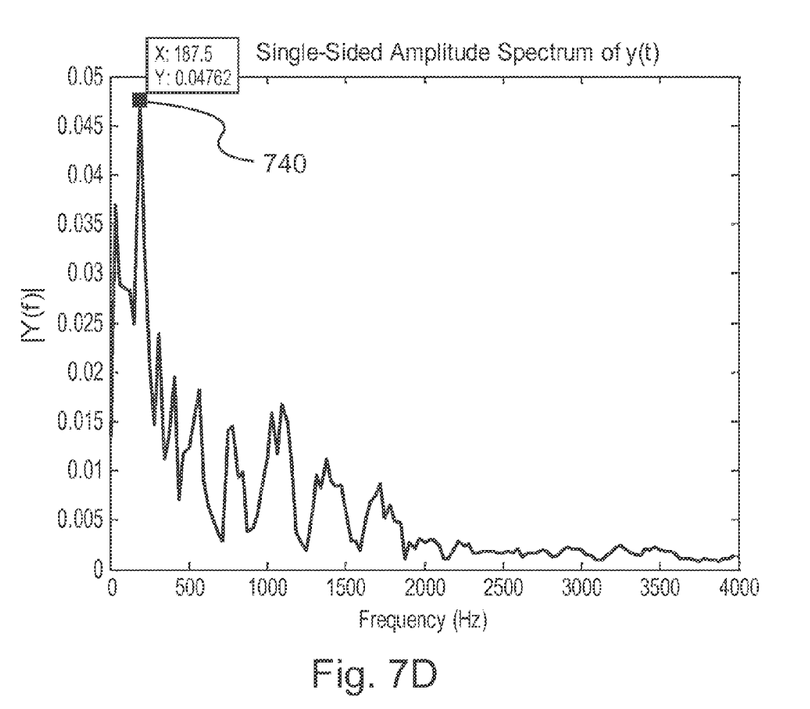

FIG. 7C illustrates that the time section of acceleration file 620 taken between 40 milliseconds and 60 milliseconds has measurable frequency content 730. FIG. 7D shows the dominant frequency at 740 corresponds to a frequency of 187 Hz. In this case, actuator drive module 122 would use the overdrive voltage from lookup table 300 corresponding to 187 Hz, since that is the dominant frequency as shown in FIG. 7D.

Figure 7E:
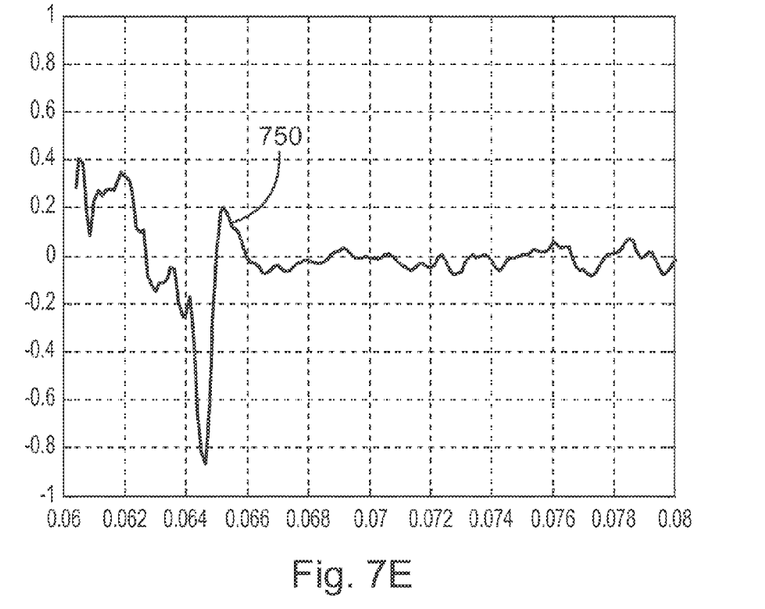
Figure 7F:
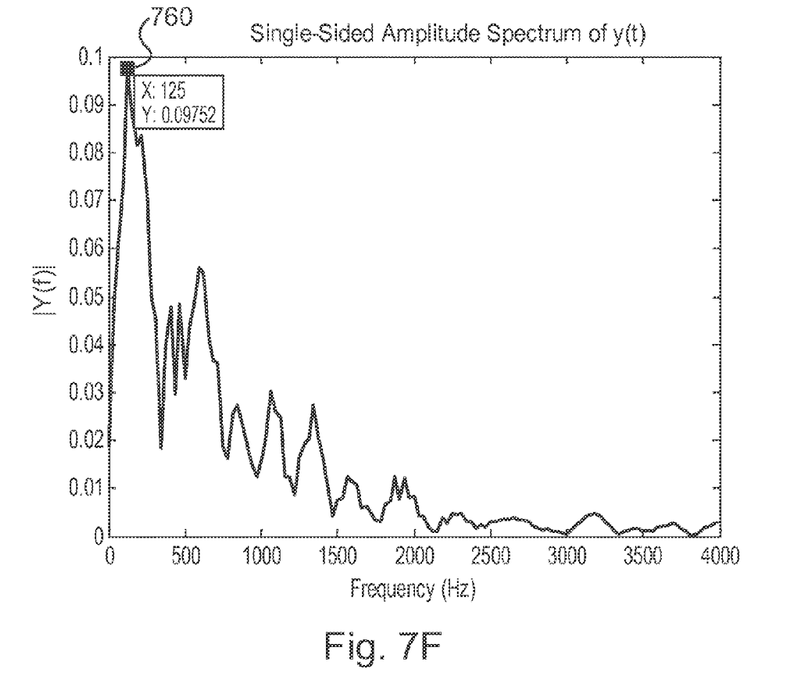

FIG. 7E illustrates the time section of acceleration file 630 taken between 60 milliseconds and 80 milliseconds has measurable frequency content 750. FIG. 7F shows the dominant frequency at 760 corresponds to a frequency of 125 Hz. In this case, actuator drive module 122 would use the overdrive voltage from lookup table 300 corresponding to 125 Hz, since that is the dominant frequency as shown in FIG. 7F.

In another embodiment, rather than dividing into data chunks, module 122 determines the average of the overdrive voltage corresponding to all the dominant (main) frequencies found, or module 122 may overdrive using the smallest or highest overdrive values found from the dominant frequencies within the parameters of any given actuator 118.

In one embodiment actuator drive module 122 constantly looks for the appropriate values using a frequency response plot or lookup table such as the one shown in FIG. 3. Further, the frequency response in actuator drive module 122 will vary from system to system. Alternatively, a software implementation may include adding a notch filter (not shown) to system 110. Further, a hardware implementation may include using a two-stage notch filters (not shown). In the hardware embodiment, the two stage notch filters may be configured as two passive stages; one active and one passive stage; or two active stage filters, depending on cost concerns.

Figure 8:
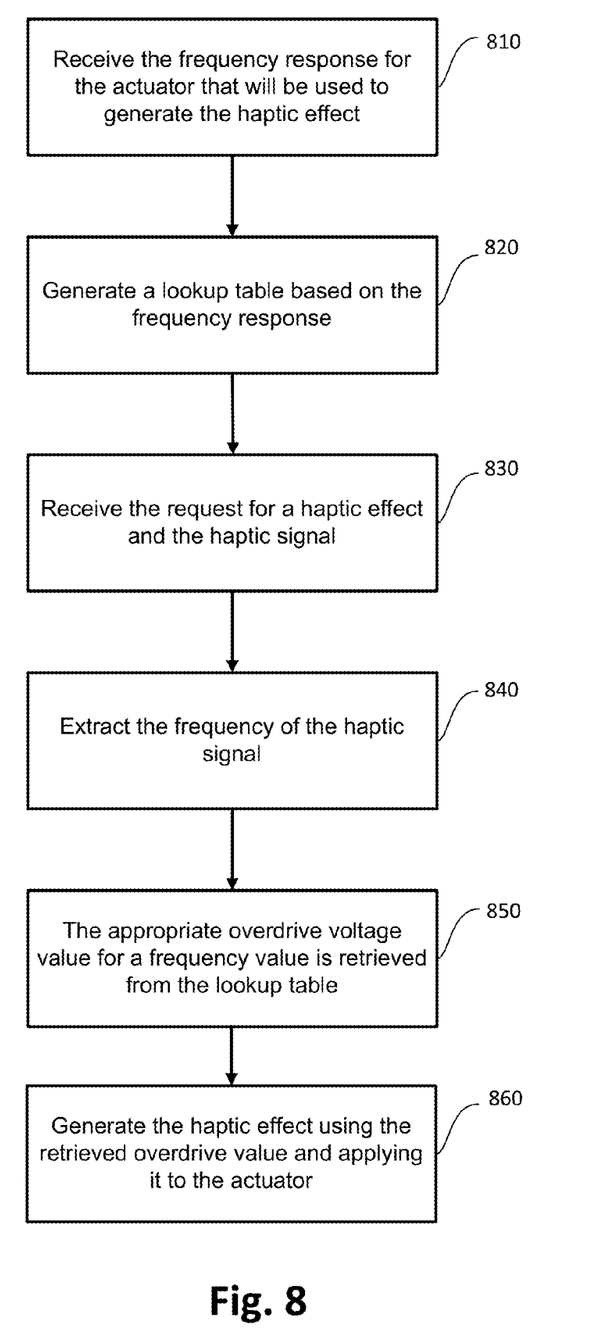
FIG. 8 illustrates a flow diagram of the functionality of the actuator drive module according to one embodiment of the invention.

FIG. 8 illustrates a flow diagram of the functionality of actuator drive module 122, according to one embodiment of the invention. In one embodiment, the functionality of FIG. 8 is implemented by software stored in memory or another computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 810, the frequency response for the actuator that will be used to generate the haptic effect is received. The frequency response will likely vary from actuator to actuator and is typically determined at the manufacturer's recommended voltage (e.g., 6V for the actuator of FIG. 2).

At 820, a lookup table (e.g., lookup table 300 of FIG. 3) based on the frequency response is generated. In one embodiment, the lookup table is generated using inverted plant control methods, where the mathematical model of the dynamic response of the actuator is derived and used to create the inverse model that will allow the system to be driven at a higher magnitude. In another embodiment, an empirical model can be created by measuring the response of the actuator or system with the actuator at different overdriving voltages. The overdrive voltage that creates a higher acceleration with no mechanical noise due to the collision of the actuator moving mass and the housing the actuator will be captured as the appropriate overdriving voltage for a specific frequency. The same will be done for a set of frequencies (e.g., 50 Hz to 500 Hz). The overdrive voltage values and the corresponding frequencies can be plotted as shown in FIG. 3 and also can be used as the lookup table.

At 830, the request for a haptic effect and the haptic signal is received. The haptic signal in one embodiment may be a parameterized periodic signal or an arbitrary signal.

At 840, the frequency of the haptic signal is extracted. In one embodiment, multiple frequencies may be extracted, and different frequencies for different time durations may be extracted for arbitrary haptic signals.

At 850, the appropriate overdrive voltage value for a frequency value is retrieved from the lookup table.

At 860, the haptic effect is generated using the retrieved overdrive value and applying it to the actuator. For more than one frequency value, 850 and 860 are repeated as necessary.

As disclosed, embodiments overdrive an actuator by generating an inverted signal lookup table, and varying the voltage of the haptic signal applied to the actuator based on the lookup table. At certain frequencies the overdrive voltage is reduced to prevent the mass of the actuator from contacting the actuator casing. As a result of the overdriving, the dynamic range of the actuator is increased, and therefore haptic effects can be generated having relatively stronger shorter pulses.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer readable medium having instructions stored thereon that, when executed by a processor, cause the processor to generate haptic effects using an actuator, the generating comprising:
   receiving a frequency response for the actuator at a standard voltage;
   generating a lookup table for an overdrive voltage based on the frequency response;
   receiving a haptic signal for the haptic effect;
   extracting one or more frequencies for the haptic signal;
   determining the corresponding overdrive voltage from the lookup table for each of the frequencies; and
   for each of the frequencies, applying the corresponding overdrive voltage to the actuator, wherein the overdrive voltage is greater than or equal to the standard voltage.

2. The computer readable medium of 1, wherein the haptic signal is parameterized.

3. The computer readable medium of 1, wherein the haptic signal comprises an arbitrary signal.

4. The computer readable medium of 3, wherein the generating the lookup table further comprises:
   dividing the arbitrary signal into a plurality of time durations;
   wherein the extracting one or more frequencies comprises for each time duration, extracting the frequency using a frequency domain analysis.

5. The computer readable medium of 1, wherein the actuator comprises a linear resonant actuator.

6. The computer readable medium of 1, wherein the generating the lookup table comprises:
   deriving a mathematical model of the actuator; and
   generating an inverse model from the mathematical model.

7. The computer readable medium of 1, wherein the generating the lookup table comprises:
   measuring the frequency response of the actuator at a plurality of overdrive voltages, wherein the overdrive voltages create a higher acceleration without mechanical noise from a mass contacting a housing.

8. A method for generating haptic effects using an actuator, the method comprising:
   receiving a frequency response for the actuator at a standard voltage;
   generating a lookup table for an overdrive voltage based on the frequency response;
   receiving a haptic signal for the haptic effect;
   extracting one or more frequencies for the haptic signal;
   determining the corresponding overdrive voltage from the lookup table for each of the frequencies; and
   for each of the frequencies, applying the corresponding overdrive voltage to the actuator, wherein the overdrive voltage is greater than or equal to the standard voltage.

9. The method of claim 8, wherein the haptic signal is parameterized.

10. The method of claim 8, wherein the haptic signal comprises an arbitrary signal.

11. The method of claim 10, wherein the generating the lookup table further comprises:
    dividing the arbitrary signal into a plurality of time durations;
    wherein the extracting one or more frequencies comprises for each time duration, extracting the frequency using a frequency domain analysis.

12. The method of claim 8, wherein the actuator comprises a linear resonant actuator.

13. The method of claim 8, wherein the generating the lookup table comprises:
    deriving a mathematical model of the actuator; and
    generating an inverse model from the mathematical model.

14. The method of claim 8, wherein the generating the lookup table comprises:
    measuring the frequency response of the actuator at a plurality of overdrive voltages, wherein the overdrive voltages create a higher acceleration without mechanical noise from a mass contacting a housing.

15. A haptically enabled system comprising:
    a processor;
    an actuator drive circuit coupled to the processor;
    an actuator coupled to the actuator drive circuit, the actuator having a standard operating voltage; and
    a memory coupled to the processor that stores a frequency response lookup table that corresponds to the actuator and instructions that are executed by the processor to generate a haptic effect;
    wherein the processor:
      receives a haptic signal for the haptic effect and extracts one or more frequencies for the haptic signal;
      determines a corresponding overdrive voltage from the lookup table for each of the frequencies; and
      for each of the frequencies, applying the corresponding overdrive voltage to the actuator via the actuator drive circuit, wherein the overdrive voltage is greater than or equal to the standard voltage.

16. The system of claim 15, wherein the actuator comprises a linear resonant actuator.

17. The system of claim 15, wherein the lookup table is generated by:
    deriving a mathematical model of the actuator; and
    generating an inverse model from the mathematical model.

18. The system of claim 15, the lookup table is generated by:
    measuring the frequency response of the actuator at a plurality of overdrive voltages, wherein the overdrive voltages create a higher acceleration without mechanical noise from a mass contacting a housing.

19. The system of claim 15, wherein the haptic signal is parameterized.

20. The system of claim 15, wherein the haptic signal comprises an arbitrary signal.

* * * * *